United States Patent [19]
Conrad

[11] Patent Number: 5,630,500
[45] Date of Patent: May 20, 1997

[54] POSITIVE GEARED TRACKING PULLEY AND BELT FOR A REVERSIBLE CONVEYOR BELT SYSTEM

[76] Inventor: Rene A. Conrad, 1614 Ascension Dr., San Mateo, Calif. 94402

[21] Appl. No.: 443,346

[22] Filed: May 17, 1995

[51] Int. Cl.$^6$ ................................................ B65G 23/14
[52] U.S. Cl. ........................... 198/833; 198/835; 198/834
[58] Field of Search ..................... 198/833, 834, 198/835

[56] References Cited

U.S. PATENT DOCUMENTS

| | | | |
|---|---|---|---|
| 3,853,016 | 12/1974 | Lane, III et al. | 198/834 X |
| 4,072,062 | 2/1978 | Morling et al. | 198/834 |
| 4,283,184 | 8/1981 | Berg | 198/834 X |
| 4,449,958 | 5/1984 | Conrad | 198/834 X |
| 4,568,320 | 2/1986 | Tangorra | 198/834 X |
| 5,119,924 | 6/1992 | Kaminski | 198/835 X |

*Primary Examiner*—D. Glenn Dayoan
*Attorney, Agent, or Firm*—James E. Eakin

[57] ABSTRACT

A reversible conveyor belt system has, on at least one surface of the belt, projections arranged preferable in a plurality of asymmetrical rows and columns thereby forming a matrix engagable with an offset mating tracking surface glued to the surface of the pulley. The projections are truncated geometrical solids, pyramids, extending outwardly from the surface of the belt. When the truncated solids of the belt intermesh in the tracks provided between the rows of truncated solids on the pulley, positive alignment without creep, improved timing and increased drive force are achieved. The projections may be used on both sides of the belt, and a second belt with interlocking projections may be mounted around a second pulley and positioned beneath the main conveyor belt for heavy impact loads. The drive system includes an easily removable hub assembly wherein the shaft of the pulley defines a flat area which engages a hardened dowel wedge for providing positive drive with reduced shear.

15 Claims, 7 Drawing Sheets

POSITIVE GEARED TRACKING PULLEY AND BELT FOR A REVERSIBLE CONVEYOR BELT SYSTEM

TECHNICAL FIELD

The present invention relates to conveyor belt systems. More particularly, the present invention relates to a reversible conveyor belt system wherein positive tracking and drive force is provided at a wide and increased range of drive speeds by attaching the same interlocking, asymmetrical material to both the belt and the pulley surfaces.

BACKGROUND OF THE INVENTION

Conveyor belt systems with symmetrical interlocking surfaces are known in the prior art. Such systems may employ projections, or cogs, on the interactive surface of the drive belt to improve flexibility of the belt thereby enabling the belt to pass around pulleys of relatively small diameter. Additionally, the projections may interact with apertures of mating geometry formed in the pulley, or with projection receiving grooves formed in the pulley in an attempt to improve alignment, or tracking and pulling, of the belt.

One such prior art conveyor belt system is described in my U.S. Pat. No. 4,011,939 which discloses a pulley with symmetrical cleat-receiving annular grooves for engaging cleats formed in longitudinal rows on the belt.

Another prior art conveyor belt system utilizing V-shaped projections that engage symmetrical V-shaped grooves in the pulley is described in U.S. Pat. No. 3,987,683 which utilizes side walls to further maintain lateral alignment.

Other prior art conveyor belt systems utilize symmetrical teeth like projections on the pulley and the tracking surface of the belts, such as the system described in French Pat. No. 1,069,964. Another system described in U.S. Pat. No. 3,722,962 uses projections on the belt coupled with placement of a rotatable drive mechanism on the sprocket of the pulley. One other prior art conveyor belt system described in U.S. Pat. No. 4,290,761 teaches cylindrical projections on the tracking surface of the belt for the purpose of belt repair and provision of traction.

Some of the above described symmetrical conveyor belt systems improve belt tracking, but none provide precise tracking and centering of the belt, and none are suitable for reversible conveyor belts systems because all require at least some re-alignment, or centering, prior to reversal of the conveyor belt.

Centering a conveyor belt prior to operation generally requires use of a conventional centering kit, or centering may be manually performed. The conveyor belt must be adjusted laterally and tensioned. All of the above prior art conveyor belt systems require that the system be "re-centered", or at the least, re-tensioned, prior to reversing the direction of travel of the belt.

My U.S. Pat. No. 4,449,958 described a drive pulley having recesses for engaging projections formed as truncated pyramids having a cylindrical portion extending therefrom for increasing positive tracking and drive. As described therein, the pulley was configured with either a combination of sockets and grooves, or just sockets, or just grooves. In another embodiment, a center portion of the pulley was configured with the truncated pyramid pattern for driving a mesh belt. The truncated pyramid arrangement disclosed in the '958 patent increased positive tracking with little creep of the belt at speeds up to one thousand (1000) feet per minute.

A heretofore unmet need exists for a conveyor belt system with precise tracking and centering, locking drive, improved positive drive force and timing without creep, the ability to operate in reverse without re-centering, the ability to operate at high speeds while utilizing substantially any diameter of pulley, the ability to operate at an increased pitch, and the ability to be configured to convey high impact loads without lateral displacement.

SUMMARY OF THE INVENTION WITH OBJECTS

A general object of the invention is to provide a reversible conveyor belt system that overcomes the limitations and drawbacks of the prior art.

A specific object of the invention is to provide a reversible conveyor belt system with precise positive tracking and increased drive force, without creep, and able to utilize only one pulley, if desired, to track approximately 200 feet of belt.

Another specific object of the invention is to provide a reversible conveyor belt system having a pulley surface to which is attached the same tracking material, and geometry, as the material attached to the tracking surface of the belt enabling the use of pulleys having a wide variety of specified diameters, including very small pulleys.

Still another specific object of the invention is to provide a reversible conveyor belt system having belt and pulley tracking surfaces made from molded polyvinyl chloride plastic and polyester cording and defining truncated pyramid projections, the projections on one surface forming tracks for engagement of offset projections on the other surface, the asymmetrical engagement providing positive tracking within ±0.005, improved timing, increased pulling power from greater surface contact between the belt and the pulley, and able to move heavy objects up to 20 lbs. per square inch.

Still one more specific object of the invention is to provide a reversible conveyor belt system having mating offset truncated pyramid projections to provide precise positive tracking to enable the belt to handle extreme side loads, to convey loads at an incline of approximately 40 degrees, and to enable the direction of the belt to be reversed without performing conventional alignment procedures.

Yet one more specific object of the invention is to provide a reversible conveyor belt system without slippage, thereby increasing the life of the belt, and able to operate over a wide and increased range of drive speeds.

Yet another specific object of the invention is to provide a reversible conveyor belt system having a flattened area of the shaft of the hub for interaction with a hardened dowel thereby reducing shear and increasing the drive force of the pulley.

Yet one more specific object of the invention is to provide a reversible conveyor belt system wherein the belt defines projections on both the tracking and conveyance surfaces thereby enabling conveyance without slippage at steep pitches.

Still one more specific object of the invention is to provide a reversible conveyor belt system having at least two pulleys, and mating interlocking surfaces on at least one pulley and the belt, wherein a second belt actuated by the second pulley, and having an interlocking surface, forms a slider bed below the main interlocking conveyor belt.

One other specific object of the present invention is to provide a reversible conveyor belt system having interlocking, asymmetrical surfaces on the belt and the pulley and further having an improved pulley system with an easily removable hub assembly wherein the shaft defines a flattened portion for engagement with dowel wedges to improve drive and decrease shear.

These and other objects are achieved according to the present invention by providing a reversible conveyor belt system comprising a planar belt having at least one surface defining projections arranged preferable in a plurality of rows and columns thereby forming a matrix. The projections in the matrix engaging with identical, offset projections of attached to the outer surface of the pulley. The distance between projections in the rows and the columns may vary thereby forming an asymmetrical grid having longitudinal tracks to secure offset projections therein to prevent lateral movement of the belt.

The projections are in the form of truncated geometrical solids, pyramids are preferred, which converge away from the surface of the belt. A cylindrical portion may extend outwardly from the top surface of the truncated solid. Other projections may be used, such as lug shaped truncated pyramids with or without the cylindrical extensions.

Where the projection surfaces on the pulley and the belt interact at the pulley, the offset truncated solids on the belt interlock in tracks formed between truncated solids on the pulley, and vice versa. The truncated solids are offset both laterally and longitudinally to cause interlocking between, for instance, four adjacent solids thereby providing positive alignment, increased driving force without creep or slippage, and improved timing of the belt. The offset projections on the belt intermesh in tracks created between the columns of projections on the pulley. The precise intermeshing of the projections eliminates lateral movement of the belt and allows the pulley to provide increased drive force to the belt.

In another aspect of the present invention the projections are used on both sides of the belt. In yet another aspect of the present invention, a second belt with interlocking projections is mounted around a second pulley beneath the main conveyor belt. This aspect is particularly suitable for heavy impact loads.

The conveyor systems described above are preferably used with a drive system including an easily removable hub assembly for the pulley wherein the shaft defines a flat area which engages hardened dowel wedges for providing positive drive with reduced shear. It will be understood by those skilled in the art that the conveyor systems described above may also be used with a conventional hub assembly having a shaft with a keyway mechanism.

These and other objects, features, aspects and advantages of the present invention will be more fully apparent to those skilled in the art upon consideration of the following detailed description of the preferred embodiments, presented in conjunction with the accompanying drawings.

DETAILED DESCRIPTION OF PREFERRED EMBODIMENTS

Figure 1:
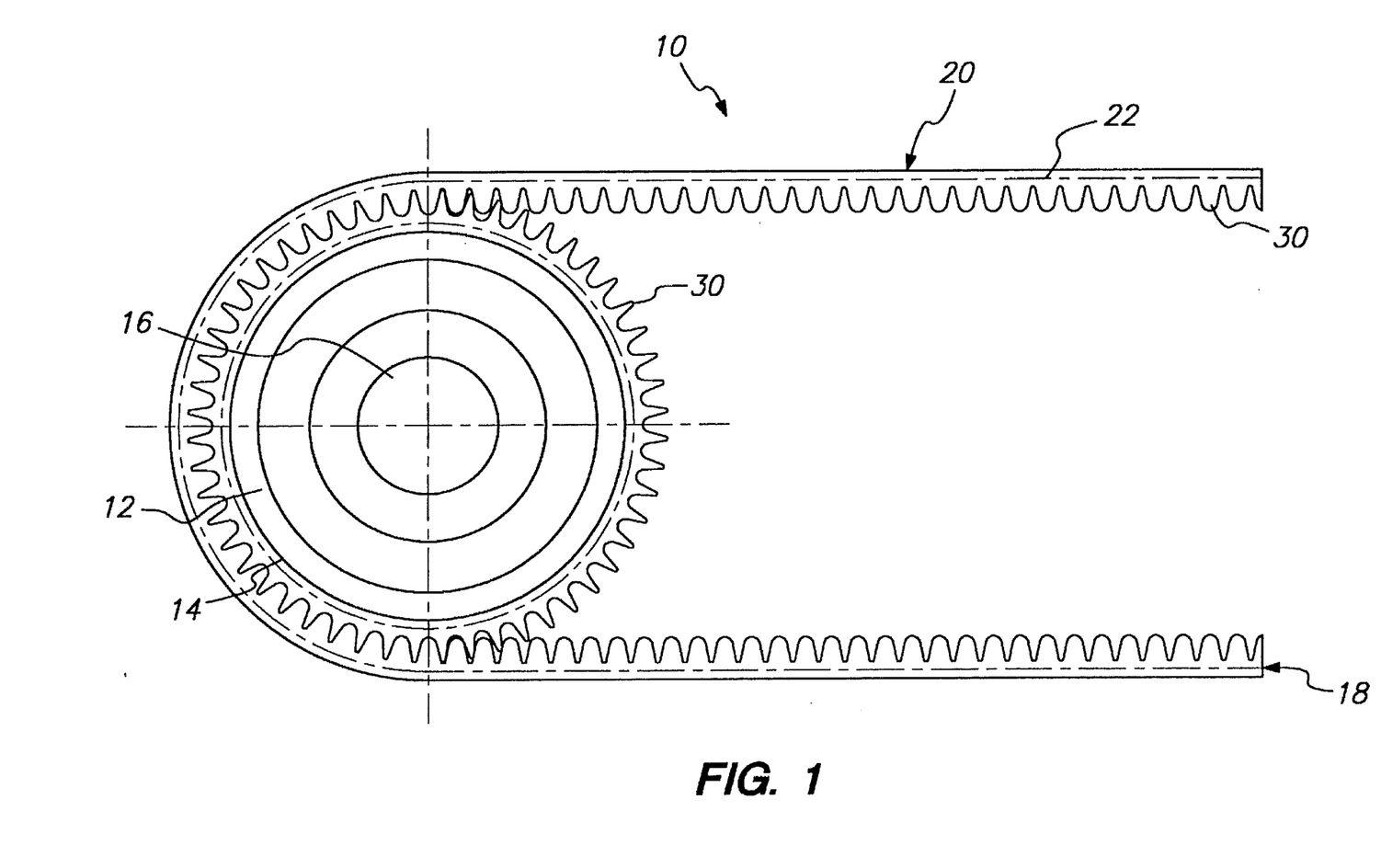
FIG. 1 is a side view of a portion of a conveyor belt system showing a pulley and belt and embodying the principles of the present invention.
Figure 2:
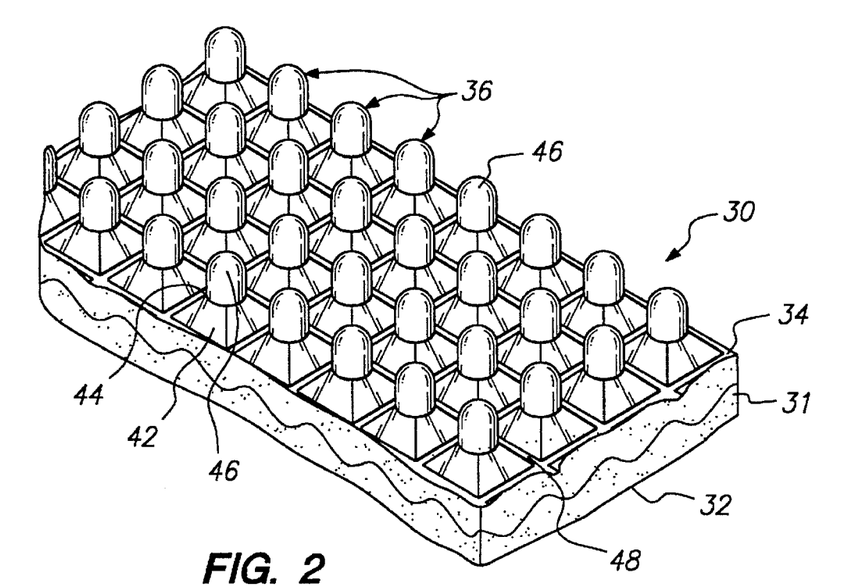
FIG. 2 is an elevated perspective view of a portion of the material showing the preferred geometric solids for the projections. The material is attached to the pulley and to the belt, or may be used in place of a conventional belt.
Figure 3:
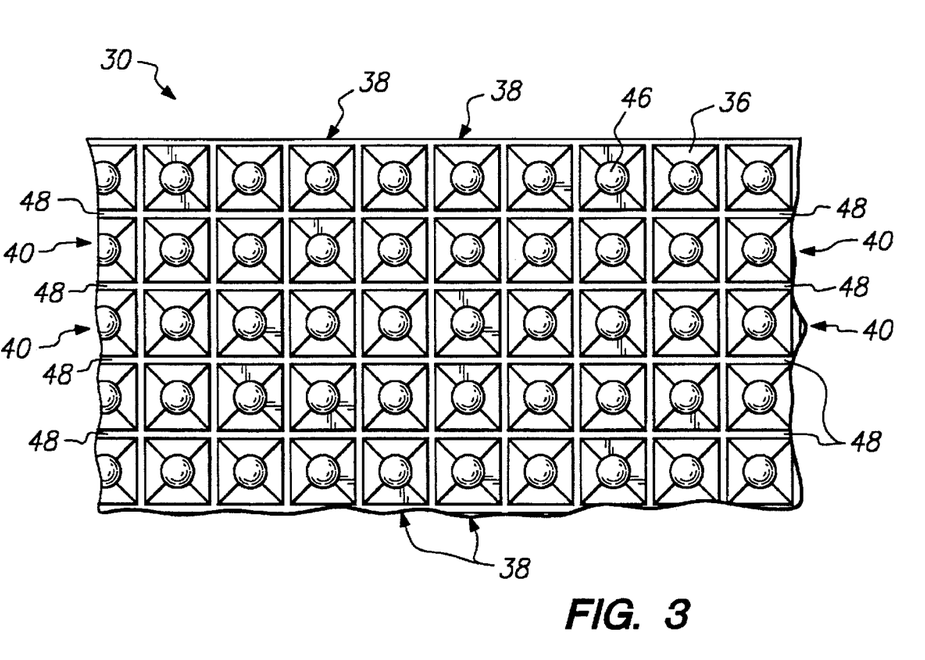
FIG. 3 is a top view of the material of FIG. 2 showing the lateral rows and longitudinal columns of projections, and showing the longitudinal tracks formed between columns.

Referring now to FIG. 1, a portion of a reversible endless conveyor belt system embodying the principles of the present invention is shown generally as 10. The system 10 generally includes a drive pulley 12 and a return pulley (not shown). The endless conveyor belt system of the present invention may utilize a variety of pulleys of different diameters and bores as long as the pulleys are positioned generally parallel to each other if it is desired for the system to operate in reverse without realignment prior to the change in direction.

The drive pulley 12 includes a planar outer surface 14 and a drive shaft 16 having an axis of rotation. An endless conveyor belt 18 is driven by the pulley 12 and defines a planar outer surface 20 and an inner surface 22 defining a grid tracking surface 30. The outer, load carrying surface 20 of the belt 18 may be made from a variety of materials, including polyester. The grid tracking surface material 30 may be attached to the inner surface 22 of a conventional conveyor belt 18 with an adhesive, or the grid material 30 may serve as a belt. As shown in FIG. 1, the grid tracking surface 30 also has been attached to, preferably, the entire outer surface 14 of the drive pulley 12. Attachment is preferably done with an adhesive and a blind rivet may be used at the seam area.

Referring now to FIGS. 2–5, the grid material 30 used as the tracking surface on both the belt 18 and the pulley surface 14 includes a base layer 31 having a planar surface 32 made of, for example, polyester cording, for attachment to the belt 18 and to the pulley surface 14. The grid material 30 is made from polyvinyl chloride, urethane, rubber, or the like, although ultrahigh molecular weight (UHMW) polyvinyl chloride is preferred, and the preferred grid material 30 is approximately 0.270 inches thick. The grid material 30 may also be constructed from other strong, long wearing, resilient plastics.

The opposed, parallel surface 34 of the grid 30 defines a tracking pattern comprised of a plurality of truncated geometric solids 36 arranged in parallel lateral rows 38 and longitudinal columns 40. The molded, geometric solids 36 are made from a durable material such as carbon fibers.

The geometric solids 36 shown in FIGS. 2–5 are truncated pyramids with polygonal bases 42, the four sides of each base 42 extending outwardly, at a pitch of approximately 0.181 thousands of an inch, from the surface 34. The four sides converge to form a smaller, planar base 44 substantially parallel to base 42. A cylindrical extension 46 may or may not extend from the base 44. The frustum configuration of the solids 36 enables the grid material 30 to bend around a pulley of small diameter without interference between adjacent solids 36.

The distance between the center of the pyramids in adjacent lateral rows 38 is approximately 0.1805 inches which is less than the distance between the center of the pyramids in adjacent columns 40 approximately 0.1885 inches. The asymmetrical pattern formed by the rows 38 and the columns 40 forms tracks 48 between and extending the length of the columns 40.

Figure 4:
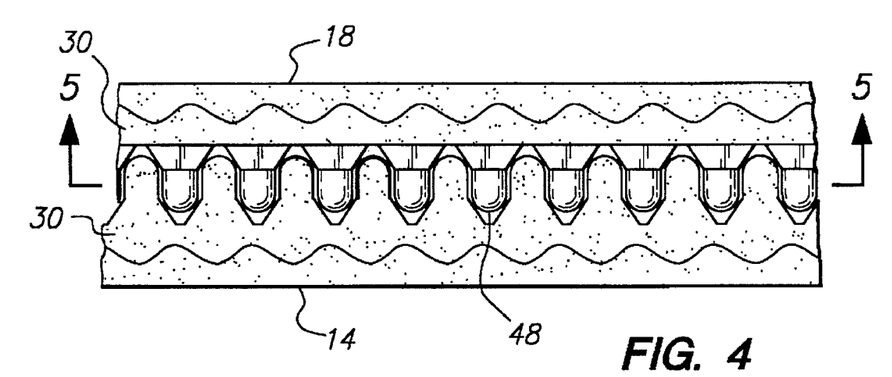
FIG. 4 is a side view of two intermeshed, offset sections of the material of FIGS. 2 and 3.
Figure 5:
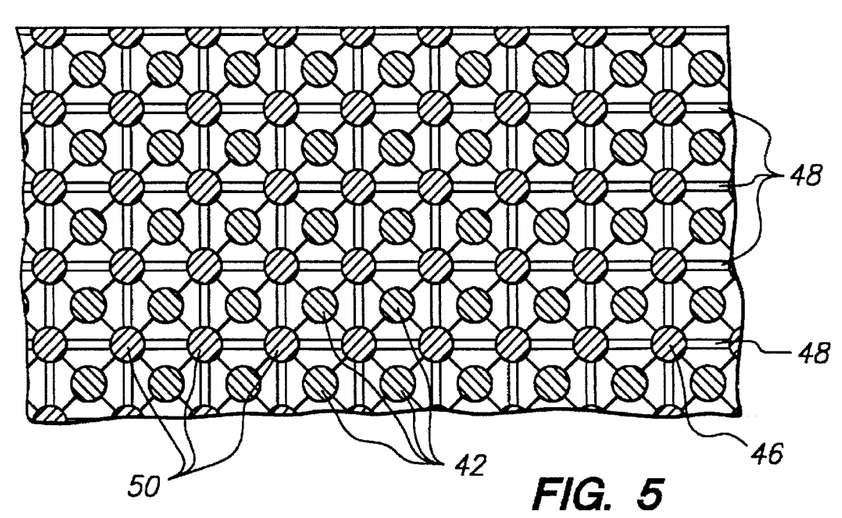
FIG. 5 is a top, sectional view taken along lines 5—5 of FIG. 4, thereby removing all of the top intermeshed layer except for a portion of the cylindrical extensions, and showing the lateral and longitudinal offset to position an intermeshing solid on a belt between four adjacent solids on a pulley.

Referring now to FIGS. 4 and 5, the grid material 30 on the pulley surface 14 and the belt 18 intermesh at the pulley 12. The grid 30 on the pulley surface 14 is mounted so as to offset the solids 36 both laterally and longitudinally. The tracks 48 receive the offset pyramids 36 in the areas 50 formed between four adjacent bases 42 as best shown in FIG. 5 where the top grid portion of the belt has been cut away leaving only the cylindrical extensions 46. The interlocking at four points precisely maintains the position of the belt without the possibility of lateral creep or slippage.

Figure 6A:
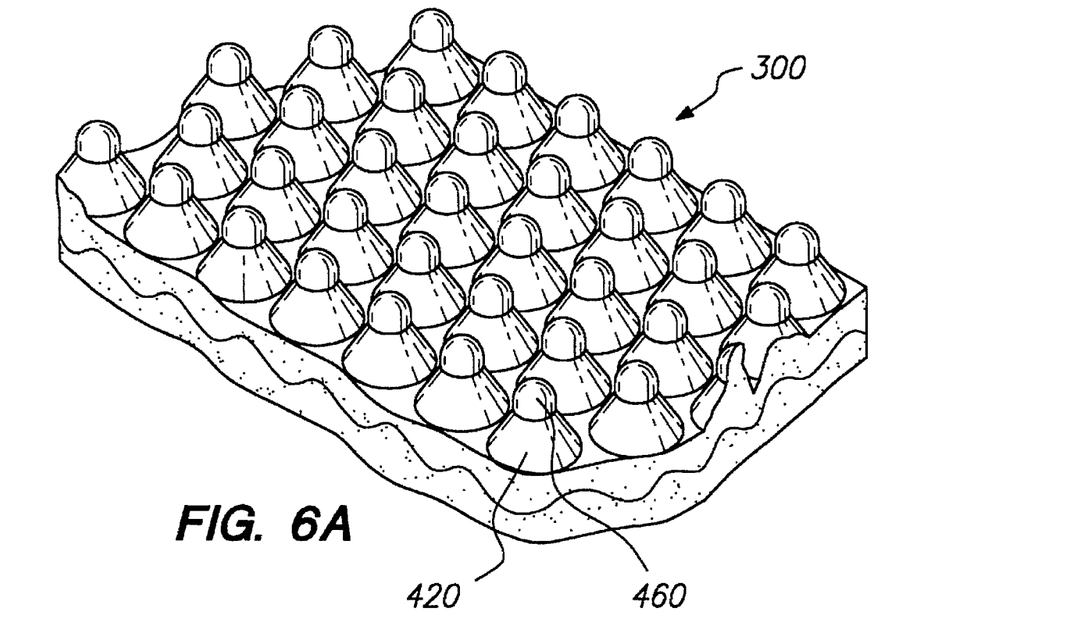
FIG. 6A, 6B, 6C, 6D are comparable views to FIGS. 2–5 showing another preferred projections, truncated pyramids having cylindrical bases. In this aspect of the invention, the solids are offset in the columns on the material thereby causing intermeshing to occur between three adjacent pyramids as shown in FIG. 6D.
Figure 6B:
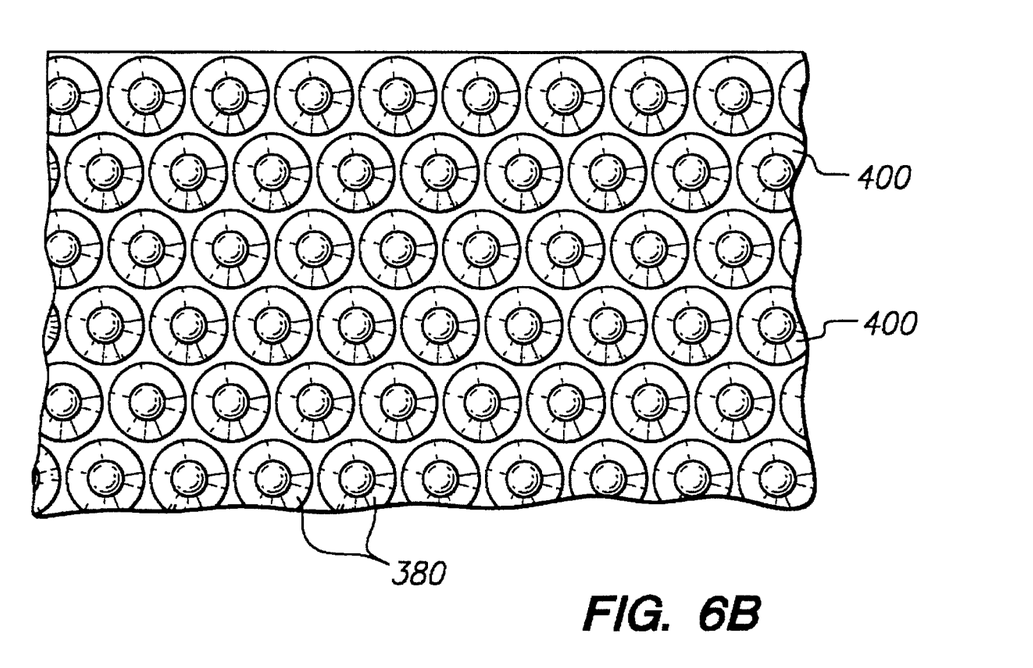
Figure 6C:
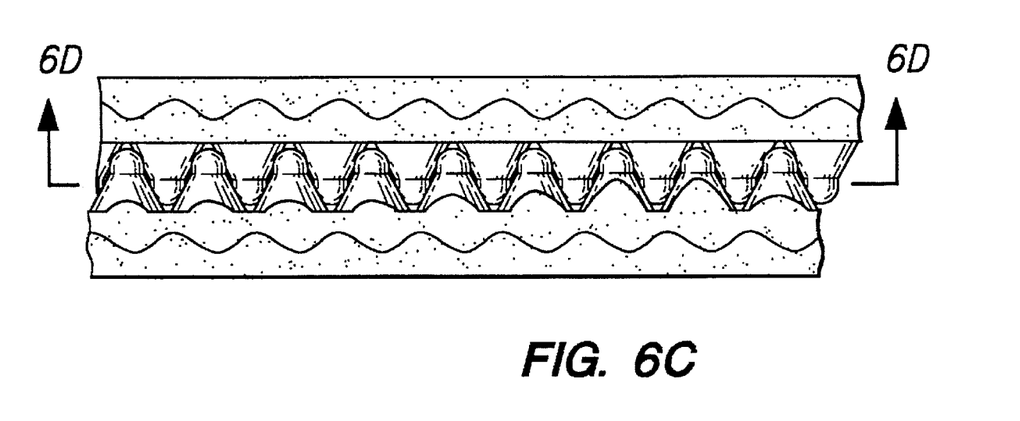
Figure 6D:
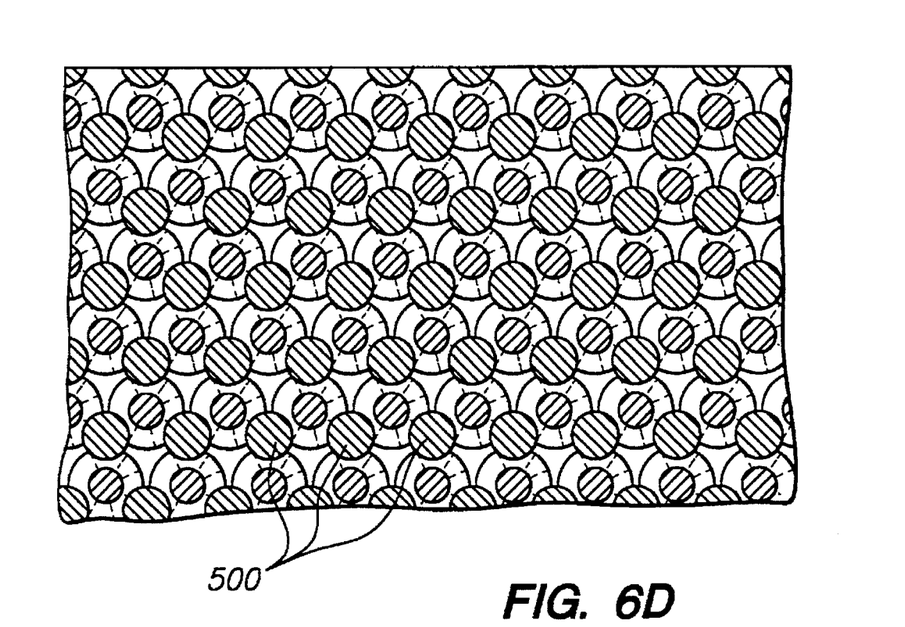

Referring now to FIGS. 6A through 6D, an alternative grid pattern 300 includes generally cylindrical frustums 420 and cylindrical extensions 460. The frustums 420 are arranged in parallel columns 400 with staggered rows 380. Intermeshing occurs at the intersections 500 of three adjacent frustums, as best shown in FIG. 6D.

The procedure for forming a conveyor belt system with intermeshing grid on both the belt and the pulley optimally requires use of identical grid material from the same lot on both the belt and the pulley to avoid manufacturing inaccuracies which, when using grids from different lots, may decrease meshing. Preferably, a length of grid material sufficient to surround the pulley is cut transversely on a dimensional pitch line, and this cut portion is used as a template for aligning the grid material for the belt prior to splicing thereof to form an endless belt. The transverse cut on the remaining portion of the grid material is used to form one end of the endless belt. The endless belt is placed in the offset position on top of the pre-cut material for the conveyor belt and serves as a matching template. All projections on the belt and on the pulley portion must intermesh at the splice area of the endless belt, and at the splice area of the pulley section, prior to completing the splices by further dimensional cuts, if necessary, and gluing. Blind rivets also may be used at the slice. Cuts on the dimensional pitch lines produce symmetrical cuts at the seam areas. Preferably, the pulley is pre-machined to an accurate pitch circumference.

Figure 10:
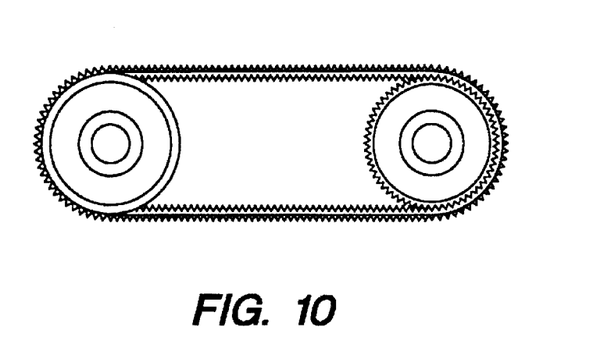
FIG. 10 is a view of a portion of a conveyor belt system having the grid tracking surface material on both surfaces of the belt.

When the interlocking grid 30 is used for both the lower surface of the belt 18 and on the pulley surface 14, pulleys as small as two inches in diameter may be utilized to operate the belt. As shown in FIG. 10 the grid also may be placed on both the upper and the lower surface of the belt for those applications where it is desired to use pulleys in opposed positions to vary the plane of the path of the belt. In these applications, generally used to carry loads upwardly or downwardly, the presence of the grid material, somewhat sticky in nature because of the presence of the polyvinyl chloride, on the working surface of the belt prevents slippage on the belt during elevation changes.

Figure 7:
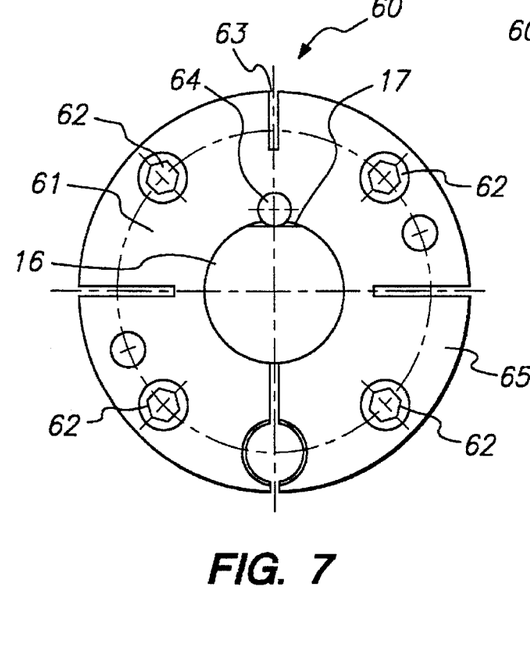
FIG. 7 is an end view of the hub of the pulley showing the flattened portion of the shaft and the dowel.
Figure 8:
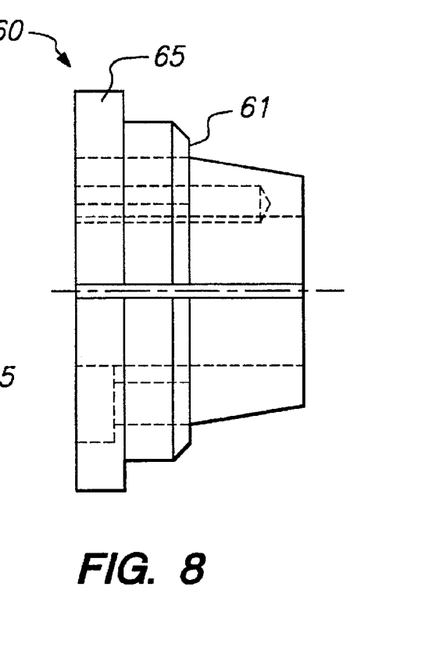
FIG. 8 is a side view of the hub of FIG. 7.

Referring now to FIGS. 7 and 8, a preferred pulley tapered hub assembly 60 is shown. The hub assembly 60 preferable is constructed from stainless steel and includes four machined screws 62 positioned around the periphery 61 of the hub at the jaw locations for uniform clamping and gripping, and for easy removal of the hub. The hub fits over the pulley shaft 16 which defines at an end thereof a machined flattened area 17. A saw cut 63 is provided through the shoulder rim 65. A hardened dowel 64 replaces a conventional keyway and is press fit against the flat 17 on the shaft 18 to prevent lateral slippage of the shaft under a load thereby increasing the drive power of the pulley.

Figure 9:
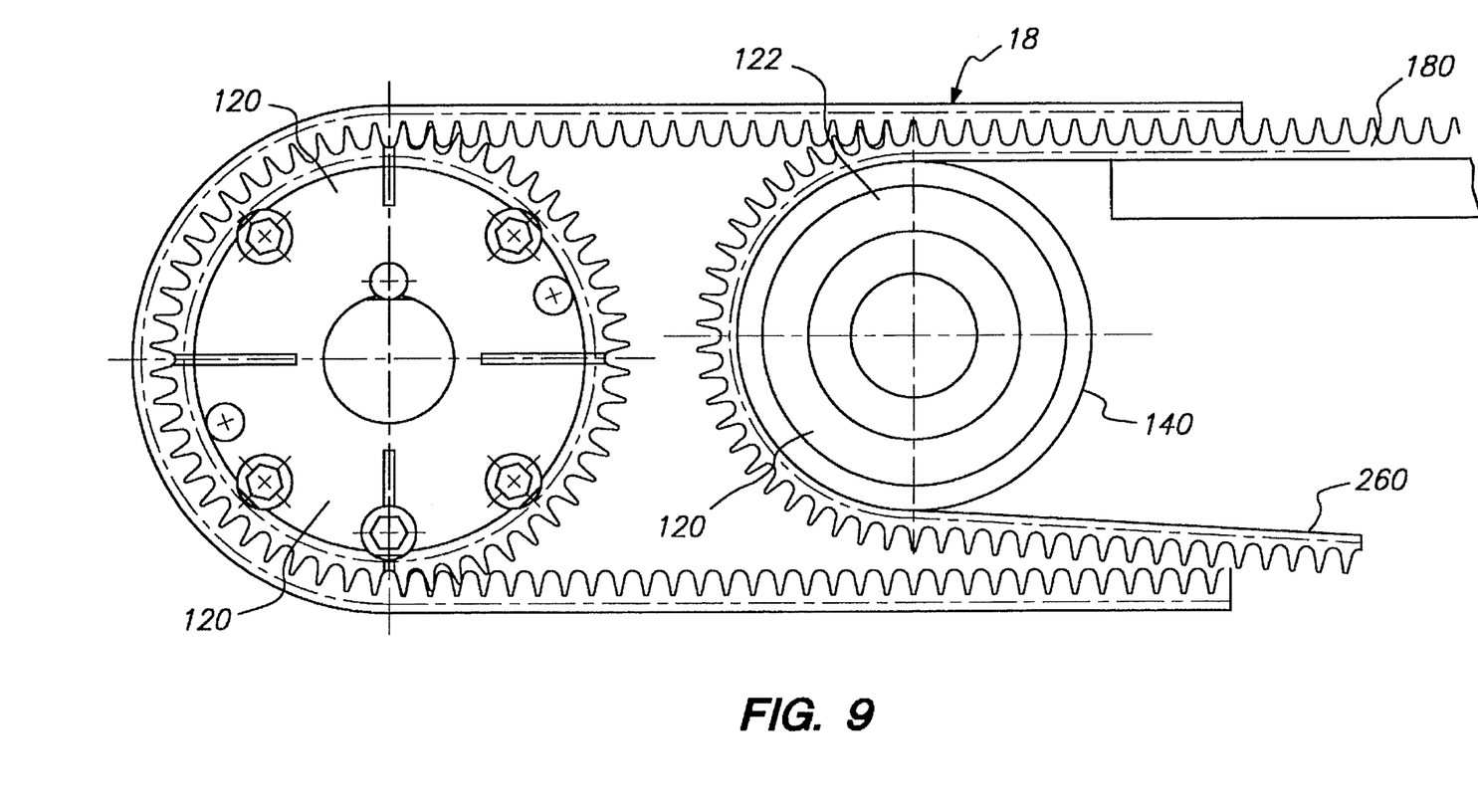
FIG. 9 is a side view of another aspect of the present invention particularly suitable for high impact loads and showing the pulley area of a conveyor belt system utilizing a second belt and pulley, the second interlocking belt serving as a slider bed to increase drive of the top belt.

Referring now to FIG. 9, another aspect of the present invention is shown utilizing two drive pulleys 120 and a second belt 180 having the grid on an upper surface thereon. The second belt 180 is driven below the main belt 18 by a pulley 120 having a smooth outer surface 140. The mating grids of the main and second belts 18, 180 provide additional drive and support particularly suitable for heavy impact loads.

Figure 11:
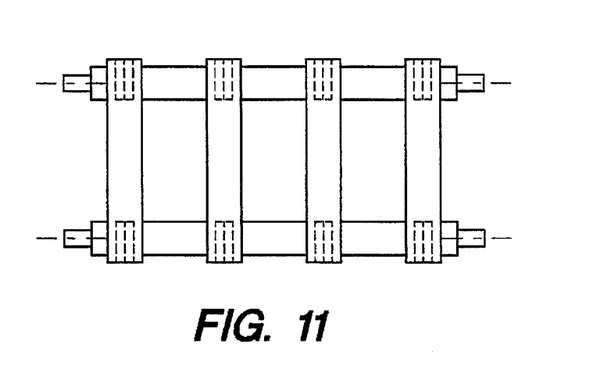
FIG. 11 is a section of a conveyor belt system showing multiple belts and embodying the principles of the present invention.

In another aspect of the invention shown in FIG. 11, multiple belts may be driven by a single pulley because the interlocking surfaces 30 prevent lateral slippage. The multiple belts may be spaced apart at any desired distance, and also may be positioned so as to be contiguous because the system substantially eliminates lateral displacement.

In operation, the reversible pulley system 10 of the present invention is able to achieve speeds of approximately 1000 feet per minute without overheating, in reverse or forward directions, as opposed to typical belt speeds of between approximately 60 to 100 feet per minute.

It will be recognized by those skilled in the art that the reversible conveyor belt system of the present invention can be configured in virtually any manner, including the use of plain stacked pulleys in certain locations if desired, and additional sets of pulleys may be provided to alter the speed of the system. The system may be used with virtually any belt as desired, including belts approved for the conveyance of foods and the like. Additionally, the geometry of the grid surfaces may be changed, and the cylindrical extensions on the truncated geometric solids may be omitted. Virtually any geometric solid that may provide a mating, offset surface sufficient to maintain alignment may be substituted for the pyramids described herein. According, the aspects discussed herein are for illustration only and should not limit the scope of the invention herein which is defined by the claims.

What is claimed is:

1. A reversible endless belt system comprising:

belt means defining lower and upper surfaces;

drive pulley means defining an outer surface, and return means, for movement of the belt means therebetween in forward and reverse directions;

flexible tracking means on as least one of the lower and upper surfaces and on the outer surface of the drive pulley means, the flexible tracking means comprising a generally planar sheet defining on a surface thereof outwardly extending projections arranged in transverse rows and longitudinal columns of projections to form an asymmetrical grid pattern, the projections in the transverse rows spaced at a distance different from a distance between projections in the longitudinal columns to form longitudinal channels between columns, the flexible tracking means on the drive pulley means offset from the flexible tracking means on the belt means so the columns of projections on the belt means interlock in the channels on the pulley means and the columns of projections of the pulley means interlock in the channels on the belt means; and drive means for rotating the drive pulley means.

2. The reversible belt system of claim 1 wherein the flexible tracking means on the belt means and on the drive pulley means is made from a single piece of polyvinyl chloride grid material, and the flexible tracking means on the drive pulley means is offset from the flexible tracking means on the belt means both laterally and longitudinally so that each interlocking truncated solid is held between four adjacent truncated solids.

3. The reversible belt system of claim 1 wherein the projections are spaced apart cones arranged in rows and columns, the cones on the drive pulley means offset from the cones on the belt means so that an interlocking cone is held by three adjacent cones.

4. The conveyor belt system of claim 1 wherein the drive pulley means further comprises a drive shaft defining a flat for engagement with a hardened dowel attached to a hub assembly.

5. The reversible belt system of claim 1 wherein the interlocking projections on the belt means and the drive pulley means enable transfer of a drive force from the drive pulley means to the belt means and further prevent lateral movement of the belt means.

6. The belt system of claim 1 wherein the drive pulley means comprises at least a first and second drive pulley and the belt means comprises a first and second belt, the first drive pulley having the flexible tracking means attached thereto and driving the first belt, the second drive pulley driving the second belt positioned beneath the first belt, the second belt defining an upper surface having the flexible tracking means for interlocking with the tracking means of the first belt.

7. The belt system of claim 1 wherein the belt means comprises a plurality of contiguous parallel belts around the drive pulley means.

8. The belt system of claim 7 wherein the plurality of belts comprises belts defining different lengths.

9. The belt system of claim 1 enabling a belt speed of substantially 1000 feet per minute.

10. The belt system of claim 1 wherein an adhesive means is used to attach the flexible tracking means to the outer surface of the drive pulley means.

11. The belt system of claim 1 wherein the flexible tracking means is on the upper and lower surface of the belt means.

12. The belt system of claim 1 wherein the projections in the rows are spaced apart approximately 0.1805 inches and the projections in the columns are spaced apart approximately 0.1885 inches.

13. An endless conveyer belt system comprising:

means for powering the system;

rotatable pulley means operatively connected to the means for powering the system;

endless belt means positioned over the pulley for movement therewith and defining upper and lower surfaces;

return means operatively engaged with the belt means; and flexible tracking means attached to both an outer surface of the drive pulley means and to at least one of the upper and lower surfaces of the belt means, the flexible tracking means defining outwardly extending truncated pyramids arranged in asymmetrical lateral rows and columns forming longitudinal channels between the rows for engagement of offset longitudinal columns of truncated pyramids.

14. The endless conveyor belt system of claim 13 wherein the flexible tracking means defines outwardly extending cones arranged in lateral rows and longitudinal columns, the rows and columns forming longitudinal channels so that an interlocking cone is held by three adjacent cones.

15. The endless conveyor belt system of claim 13 wherein the belt means comprises a plurality of spaced apart, parallel belts engaged around the drive pulley means.

* * * * *